(12) United States Patent
Navarro et al.

(10) Patent No.: US 8,796,403 B2
(45) Date of Patent: Aug. 5, 2014

(54) COPOLYMERS WITH POLAR AND NON-POLAR OLEFIN BLOCKS

(75) Inventors: Christophe Navarro, Lahonce (FR); Alexandra Leblanc, Franchville (FR); Vincent Monteil, Lyons (FR); Roger Spitz, Villeurbanne (FR); Christophe Boisson, Villeurbanne (FR); Jean-Pierre Broyer, Bron (FR)

(73) Assignees: Arkema France, Colombes (FR); CNRS, Paris (FR); Ecole Superieure de Chimie Physique Electronique de Lyon, Villeurbanne (FR)

(*) Notice: Subject to any disclaimer, the term of this patent is extended or adjusted under 35 U.S.C. 154(b) by 413 days.

(21) Appl. No.: 13/126,369

(22) PCT Filed: Oct. 27, 2009

(86) PCT No.: PCT/FR2009/052058
§ 371 (c)(1),
(2), (4) Date: Jul. 21, 2011

(87) PCT Pub. No.: WO2010/049633
PCT Pub. Date: May 6, 2010

(65) Prior Publication Data
US 2011/0301295 A1 Dec. 8, 2011

(30) Foreign Application Priority Data
Oct. 27, 2008 (FR) ...................................... 08 57293

(51) Int. Cl.
*C08F 4/80* (2006.01)
*C08F 220/10* (2006.01)
*C08F 210/00* (2006.01)

(52) U.S. Cl.
USPC ........ 526/172; 526/169.1; 526/169; 526/145; 526/348; 526/329.7; 526/346

(58) Field of Classification Search
USPC .............. 526/172, 170, 161, 160, 169.1, 169, 526/348, 329, 328, 329.7
See application file for complete search history.

(56) References Cited

U.S. PATENT DOCUMENTS

| | | | | |
|---|---|---|---|---|
| 4,698,403 | A | * | 10/1987 | Klabunde ...................... 526/126 |
| 5,880,241 | A | | 3/1999 | Brookhart et al. |
| 5,994,446 | A | * | 11/1999 | Graulus et al. ................ 524/484 |
| 6,410,664 | B1 | | 6/2002 | Bansleben et al. |
| 6,417,303 | B1 | | 7/2002 | Stibranv et al. |
| 6,479,425 | B1 | | 11/2002 | Stibranv et al. |
| 6,506,704 | B1 | | 1/2003 | Bansleben et al. |
| 6,506,861 | B2 | | 1/2003 | Wang et al. |
| 6,541,585 | B2 | | 4/2003 | Johnson et al. |
| 6,576,779 | B1 | | 6/2003 | Bansleben et al. |
| 6,777,510 | B1 | | 8/2004 | Philipp et al. |
| 7,060,768 | B2 | | 6/2006 | Brookhart et al. |
| 7,087,687 | B2 | * | 8/2006 | Goodall et al. ................ 526/117 |
| 7,439,314 | B2 | | 10/2008 | Johnson et al. |
| 2004/0024149 | A1 | | 2/2004 | Bazan et al. |
| 2006/0270811 | A1 | * | 11/2006 | Shen et al. ..................... 526/113 |
| 2007/0049712 | A1 | * | 3/2007 | Allen et al. .................... 526/171 |
| 2010/0261857 | A1 | * | 10/2010 | Senda et al. ..................... 526/87 |

FOREIGN PATENT DOCUMENTS

WO   WO 00/56785 A1 * 9/2000 ............. C08F 10/00
WO   WO 2004/078337 A2 * 9/2004

OTHER PUBLICATIONS

Gibson, V.C.; Tomov, A. Chem. Commun. 2001, 1964-1965.*
Klabunde et al. J. Mol. Catal. 1987, 41, 123-134.*
Skupov et al. Macromol. Rapid Commun. 2007, 28, 2033-2038.*
Matsugi et al. J. Polym. Sci., Part A: Polym. Chem. 2003, 41, 3965-3973.*
Yasuda et al. Macromolecules 1992, 25, 5115-5116.*
Gibson, V. et al., "Functionalized polyolefin synthesis using [P,O] Ni catalysts" Chemical Communications, (1964), pp. 1964-1965.
Klabunde, U., et al., "Nickel Catalysts for Ethylene Homo- and Co-polymerization", J of Molecular catalysts, Lausannem Ch. vol. 41, No. 1/02. (1987), pp. 123-134.
K.M . Skupov et al. "Palladium aryl Sultanate Phosphine Catalysts for the Copolymerization of acrylates with Etene", Macromol. Rapid Commun., vol. 28, (2007), pp. 2033-2038.
Hajime. Y., et al. "New Approach to Block Copolymerization of Ethylene with Alkyl Methacrylates and Lactones by Unique Catalysts with Organolanthanide Complexes", American Chemical Society, (1992), pp. 5115-5116.
Matsugi, T . et al., "Synthesis and morphology of ofpolyethylene-block-poly(methyl methacrylate) through the combination of metal-locene catalysts with living radical Polymerization", Journal of Polymer Science, Part A: Polymer Chemistry, vol. 41. (2003), pp. 3965-3973.

* cited by examiner

*Primary Examiner* — Rip A. Lee

(74) *Attorney, Agent, or Firm* — RatnerPrestia

(57) ABSTRACT

The present invention relates to copolymers with polar and non-polar olefin blocks with a variable polar monomer content of 0.1 mol % to 99.9 mol %. The invention also relates to a method for obtaining copolymers with olefin blocks and vinyl polar monomer blocks, said method using a single-component catalytic system made up of an organometallic complex containing a metal belonging to groups VIII to X. Said organometallic complex is advantageously active in the medium without adding cocatalyst.

18 Claims, 1 Drawing Sheet

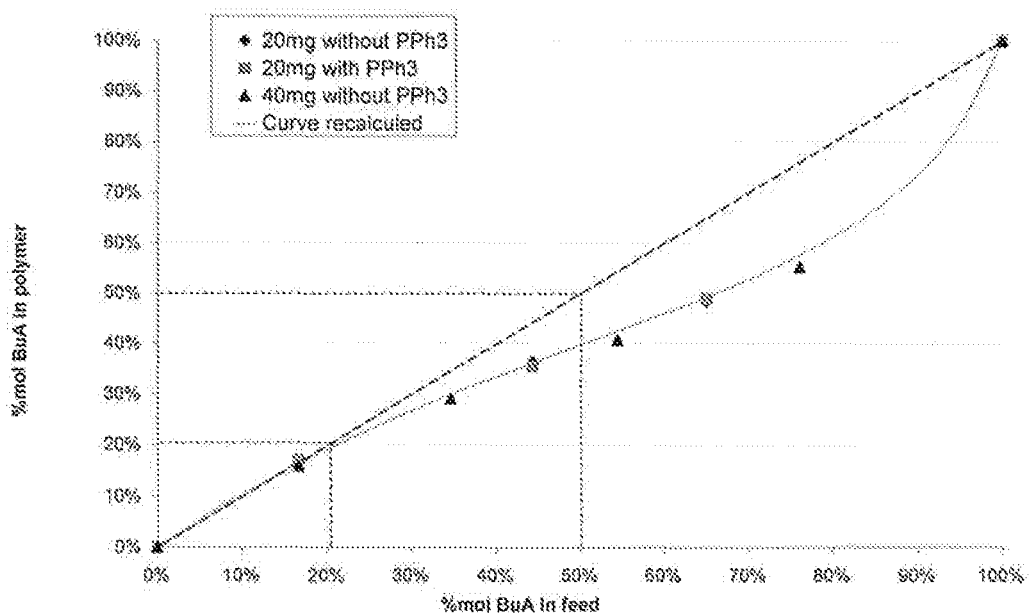

COPOLYMERS WITH POLAR AND NON-POLAR OLEFIN BLOCKS

CROSS-REFERENCE TO RELATED APPLICATIONS

This application is a United States national phase application of International (PCT) Application No. WO/FR2009/052058, filed Oct. 27, 2009, which in turn claims priority from French Application No. 0857293, filed Oct. 27, 2008.

FIELD OF THE INVENTION

The present invention relates to copolymers with polar and non-polar olefin blocks with a variable polar monomer content of 0.1 mol % to 99.9 mol %. The invention also relates to a method for obtaining copolymers with olefin blocks and vinyl polar monomer blocks, said method using a single-component catalytic system made up of an organometallic complex based on a metal belonging to groups VIII to X.

BACKGROUND OF THE INVENTION

The introduction of functionalities into non-polar chains (such as polyolefins) would make it possible to greatly modify the properties of the polymers in terms of hardness, adhesion, barrier properties and surface (coloration), but also in terms of rheology or of miscibility with the other polymers, while at the same time retaining the mechanical properties associated with polyolefins. Conversely, the introduction of non-polar olefin units into polar polymer chains (in particular (meth)acrylic polymers) would make it possible to improve their mechanical properties, their flexibility properties and their properties of resistance to chemical products. The synthesis of functional polyolefins is thus of great interest.

However, the efficiency of the copolymerization of polar and non-polar olefins is limited by the difference in reactivity of the comonomers: non-polar olefins are generally polymerized by catalysis, whereas polar monomers are polymerized by radical or ionic polymerization. In order to introduce functionalities onto polyolefins, two strategies (catalytic or radical) have therefore been envisioned.

Catalytic methods of polymerization and copolymerization of polar and non-polar olefins have been widely described. Some report the use of organometallic catalysts of metals belonging to group IV (Ti, Zr, etc.). Unfortunately, these highly oxophilic systems are rapidly poisoned by the functional group of the polar monomers. In order to remedy this poisoning, some have chosen to add a cocatalyst (of alkylaluminum type) to their system (Marques M. M. et al, Journal of Polymer Science: Part A: Polymer Chemistry, Vol. 37, 2457-2469, 1999; Aaltonen P. et al, *Macromolecules* 1996, 29, 5255-5260), with the aim of chemically protecting the polar functional group. These systems are then capable of copolymerizing ethylene and monomers of hydroxy- or carboxy-alpha-olefin type (for example: 10-undecen-1-ol). The copolymers obtained contain a maximum of 10 mol % of the polar monomer. In this case, the major drawback of the system is the need to add a cocatalyst in order to protect the polar functional group of the polar olefin, which renders the system obsolete since the cocatalyst should be used stoichiometrically with the polar monomer.

The same observation can be made with regard to certain nickel-based systems (Carlini C. et al, *Macromol. Chem. Phys.* 2002, 203, 1606-1613). The addition of methylaluminoxane (MAO) to the system as cocatalyst also acts as protection for the polar functional group. These systems then make it possible to copolymerize ethylene and methyl methacrylate (MMA) with degrees of MMA insertion ranging from 3 mol % to 80 mol %. However, the copolymers obtained exhibit either a very predominant incorporation of methyl methacrylate (between 61 mol % and 82 mol %) but with low molar masses (less than 30 000 g/mol) and a high polydispersity index (greater than 30) with an Ni(II) complex, or a very low incorporation of methyl methacrylate (between 3 mol % and 7 mol %) for copolymers of high molar masses (between 49 000 and 290 000 g/mol) with an Ni(0) complex.

Other systems, based on copper (U.S. Pat. No. 6,417,303, U.S. Pat. No. 6,479,425, Pracella M. et al, *Journal of Polymer Science: Part A: Polymer Chemistry*, Vol. 45, 1134-1142, 2007), also make it possible to synthesize ethylene/acrylate or ethylene/methacrylate copolymers, but require the use of a cocatalyst of alkylaluminum type (MAO).

Other teams have reported the use of organometallic catalysts of less oxophilic metals belonging to group X (Ni, Pd), without protection of the polar functional group by an alkylaluminum (Mecking S, *Coordination Chemistry Reviews* 2000, 203, 325-35; Johnson L. K et al, *Chemical Reviews* 2000, 100, 1169-1203; Boffa L. S. and Novak B. M., *Chem. Rev.* 2000, 100, 1479-1493). These nickel- and palladium-based systems (also described in the following documents: WO0192348, WO0192354, WO02059165, WO9623010, WO9842664, WO2004101634, U.S. Pat. No. 6,777,510) are limited to polar monomer incorporations of a maximum of 15 mol % since they result in copolymers of which the polyethylene part is rich in branching (approximately 100 branches per 1000 C) and of which the polar functional group is always inserted at the end of branches of the polymer. These systems can be used without a cocatalyst, but make it possible to copolymerize only a restricted number of polar monomers, such as functionalized norbornenes or acrylates.

Other palladium-based systems have been described (WO0192342, Liu S. et al, *Organometallics* 2007, 26, 210-216, Skupov K. M. et al, *Macromol. Rapid Commun.* 2007, 28, 2033-2038), which incorporate the polar monomer into the backbone of the polymer chain so as to give ethylene/alkyl acrylate copolymers containing up to 17 mol % of alkyl acrylate, in isolated units in the copolymer chain. The drawback of these systems is that they produce polymers of low molecular masses (less than $10^4$ g/mol, or even than $10^3$ g/mol as soon as a notable proportion of polar monomer (at least 10%) is integrated into the copolymer).

The use of these known catalytic systems does not make it possible to obtain copolymers having sequences in the form of polar olefin blocks and non-polar olefin blocks, with balanced proportions of each constituent within the copolymer, for molecular masses greater than 10 000 Da.

The second strategy used for the copolymerization of polar and non-polar olefins uses radical chemistry. It is mostly industrial processes which make it possible to obtain, for example, copolymers of ethylene and of vinyl acetate (ethylene vinyl acetate or EVA, vinyl acetate/ethylene or VAE copolymer). However, these processes do not make it possible to obtain a controlled microstructure of the polymers; in polymers obtained by radical polymerization, the comonomers are distributed randomly in the polymer chain, which has branches; the polymerization conditions are restrictive, in terms of temperature (which can go up to 350°) and of pressure (up to 3000 bar).

Other known radical systems make it possible to copolymerize polar and non-polar olefins under milder conditions. MMA/ethylene and MMA/1-hexene copolymers are obtained using the radical initiator AIBN in the presence of the comonomers (Nagel M. et al, *Macromolecules* 2005, 38, 7262-7265; Liu S. S. and Sen A. M., *Journal of Polymer Science Part A: Polymer Chemistry*, Vol. 42, 6175-6192 2004). MMA/1-octene and methyl acrylate (MA)/1-octene copolymers have been obtained in the presence of a copper system of "atom transfer radical polymerization" ATRP type (Venkatesh R. and Klumpermann B., *Macromolecules* 2004, 37, 1226-1233). MA/hexene and MA/norbornene copolymers have been obtained by radical polymerization using a palladium complex (Tian G. et al, *Macromolecules* 2001, 34, 7656-7663).

The major drawback of these systems comes from the fact that no sequence of non-polar olefins in the form of a block has been observed. Only isolated units of non-polar olefins in a polar olefin chain are observed in the copolymer.

It must be concluded that no known system makes it possible to suitably copolymerize non-polar and polar olefins. Catalysis makes it possible to obtain polyolefins containing a limited level of polar monomer, while radical polymerization makes it possible to obtain polar polymers containing a limited level of olefin.

SUMMARY OF THE INVENTION

The present invention proposes to remedy the abovementioned drawbacks of the techniques for copolymerization of polar and non-polar monomers.

The object of the present invention is to provide a method of copolymerization of polar monomers and non-polar monomers in the presence of a given single-component catalytic system, producing block copolymers containing both one or more polar monomer blocks and one or more non-polar monomer blocks, in particular ethylene blocks.

According to a first subject, the invention relates to a method for preparing block copolymers from at least one non-polar monomer, in particular ethylene, and at least one polar monomer. Advantageously, the copolymerization is carried out in the presence of a catalytic system made up of an organometallic complex of formula:

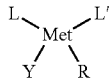

where:
Met represents a metal belonging to groups VIII, IX and X,
Y represents a ligand molecule oxidizing the metal and made up of heteroatomic groups based on C, H and at least one atom selected from: O, S, P and N, and preferably of phenoxy type,
L represents a complexing molecule made up of heteroatomic groups based on C, H and at least one atom selected from: O, S, P and N, and preferably of imine or glide type,
L' represents a monodentate, electron-donating, complexing molecule, such as a phosphine or pyridine, preferably a phosphine, and even more preferably triphenylphosphine,
R is a hydrocarbon-based group of alkyl or alkylaryl type containing from 1 to 20 C atoms, or of cycloalkyl or phenyl type containing from 6 to 20 C atoms, preferably a methyl or phenyl group.

According to a second subject, the invention relates to copolymers with polar and non-polar olefin blocks containing both sequences (blocks) of polar olefins and sequences (blocks) of non-polar olefins, said block copolymers being obtained by means of the abovementioned method.

According to a third subject, the invention relates to the use of a catalytic system made up of an organometallic complex of formula:

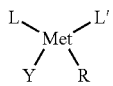

(where Met, R, L, L' and Y have the same meaning as above), for the block copolymerization of at least one non-polar monomer, in particular ethylene, and of at least one polar monomer.

Other characteristics and advantages will emerge from the detailed description of the copolymerization method according to the invention that will follow and from the nonlimiting exemplary embodiments of the invention.

In order to solve the problem of the copolymerization of non-polar and polar olefins, the present invention puts into place a single-component neutral catalytic system based on metals belonging to groups VIII to X, used under mild temperature and pressure conditions allowing the synthesis of olefin and polar monomer multiblock copolymers, without control of the length of the various polar olefin blocks and non-polar olefin blocks.

DETAILED DESCRIPTION OF THE INVENTION

The term "olefin" is intended to mean an unsaturated hydrocarbon which comprises at least one terminal covalent double bond between two carbon atoms. Olefins are non-polar compounds. The olefins used in the context of the invention are ethylene, propylene, higher alpha-olefins, norbornene and its derivatives, and styrene derivatives in the case where the comonomer combined is not ethylene, propylene or an alpha-olefin.

The term "polar olefin" is intended to mean an olefin functionalized by means of at least one polar group; in the context of the invention, the polar olefins (or polar monomers) are chosen from:
unsaturated carboxylic acids, such as acrylic acid or methacrylic acid, and derivatives thereof,
unsaturated carboxylic acid esters, such as butyl acrylate and methyl methacrylate, and derivatives thereof,
styrene derivatives, such as styrene or alpha-methylstyrene considered to be a polar monomer when combined with an alpha-olefin, ethylene or propylene,
acrylamides and methacrylamides, such as acrylamide and methacrylamide, and derivatives thereof,
acrylonitrile and derivatives thereof.

According to a first subject, the invention relates to a method for preparing block copolymers from at least one non-polar monomer, in particular ethylene, and at least one polar monomer, the copolymerization being carried out in the presence of a catalytic system made up of an organometallic complex of formula:

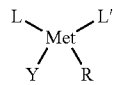

where:
Met represents a metal belonging to groups VIII, IX and X,
Y represents a ligand molecule oxidizing the metal and made up of heteroatomic groups based on C, H and at least one atom selected from: O, S, P and N, and preferably of phenoxy type,
L represents a complexing molecule made up of heteroatomic groups based on C, H and at least one atom selected from: O, S, P and N, and preferably of imine or ylide type,
Y and L can be linked by a covalent bond,
L' represents a monodentate, electron-donating, complexing molecule, such as a phosphine or pyridine, preferably a phosphine, and even more preferably triphenylphosphine,
R is a hydrocarbon-based group of alkyl or alkylaryl type containing from 1 to 20 C atoms, or of cycloalkyl or phenyl type containing from 6 to 20 C atoms, preferably a methyl or phenyl group, said method resulting in the formation of a block copolymer comprising one or more polar monomer blocks and one or more non-polar monomer blocks.

The polar monomer is selected from the group: methyl acrylate, methyl methacrylate, butyl acrylate, butyl methacrylate and styrene.

Preferably, the metal is chosen from the group: iron, cobalt, nickel, palladium and platinum. In one particularly preferred embodiment, said metal is nickel, and the organometallic complex will have one of the following structures:

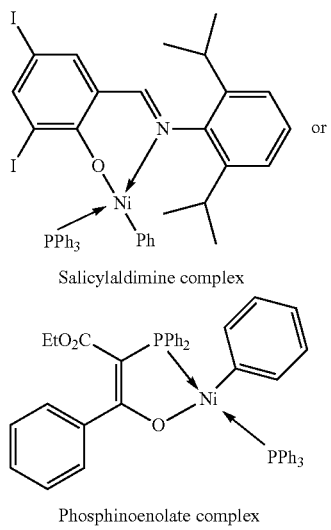

Salicylaldimine complex

Phosphinoenolate complex

The method for preparing, according to the invention, a copolymer of at least one polar olefin and of at least one non-polar olefin comprises reacting the organometallic complex as defined above in a defined solvent as follows:
- an inert hydrocarbon-based solvent for solution polymerizations,
- liquid polar monomer(s) for bulk polymerizations, in the presence of said non-polar olefins (liquid or gaseous) and polar olefins (liquid). The polymerization is carried out at between −100° C. and 250° C., preferably between 20° C. and 250° C., and at a pressure of between atmospheric pressure and 300 bar.

The insertion of the polar monomer during the ethylene/polar monomer copolymerization is promoted by
- increasing the polymerization temperature,
- adding Lewis base to the system, for example triphenylphosphine $PPh_3$, added at x equivalents (x between 1 and 20 equivalents relative to the metal),
- decreasing the ethylene pressure (and therefore the ethylene concentration in the medium).

According to a second subject, the invention relates to copolymers with polar and non-polar olefin blocks containing both sequences (blocks) of polar olefins and sequences (blocks) of non-polar olefins, said block copolymers being obtained by means of the abovementioned method.

Said copolymers have number-average molecular masses of from $10^3$ to $10^6$ g/mol, and comprising linked units (blocks) of each of said comonomers. The molar contents of each of the comonomers can range from 0.1% to 99.9%. The part of the copolymer containing the sequences of units of at least one non-polar olefin may be linear or may bear branches containing from 1 to 20 C atoms. The polydispersity index PI of the block copolymer obtained by means of the method according to the invention ranges from 1 to 6.

If:
"p-a" is defined as a bond between a polar monomer (p) and a non-polar monomer (a),
"p-p" is defined as a bond between a polar monomer (p) and a polar monomer (p),
"a-a" is defined as a bond between a non-polar monomer (olefin) (a) and a non-polar monomer (olefin) (a), it can be established that the block copolymers according to the invention that are obtained have structures that satisfy the following relationships:

$$\Sigma p\text{-}a/\Sigma p\text{-}p \ll 1$$

$$\Sigma p\text{-}a/\Sigma a\text{-}a \ll 1$$

$$\Sigma p\text{-}a > 1 \text{ in each polymer chain.}$$

These relationships indicate:
firstly, that the ratio between the sum of the bonds of "p-a" type and the sum of the bonds of "p-p" type is much less than 1,
secondly, that the ratio between the sum of the bonds of "p-a" type and the sum of the bonds of "a-a" type is much less than 1,
whereas, in each polymer chain, the sum of the bonds of "p-a" type is greater than 1.

According to a third subject, the invention relates to the use of a catalytic system made up of an organometallic complex of formula:

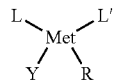

(where Met, R, L, L' and Y have the same meaning as above), for the block copolymerization of at least one non-polar monomer, in particular ethylene, and of at least one polar monomer. This complex can be used for obtaining a copolymer with blocks of at least one non-polar olefin and blocks of at least one polar olefin. It will be noted that, advantageously, said organometallic complex is active in the medium without adding a cocatalyst.

The single-component system used is capable of the catalytic polymerization of ethylene, which is known. Surprisingly and originally, the same system is capable of the radical homopolymerization and copolymerization of various polar monomers (examples 1 to 3). In addition, this system is capable, in the presence of ethylene and of polar monomers, of the copolymerization and terpolymerization of said comonomers (examples 4 to 12), thus producing quite novel block copolymers. These copolymers and terpolymers have compositions that can range from 0.1 mol % to 99.9 mol % of each of the comonomers. In addition, the activities reported in the present invention are greater than or equal to the activities (measured in g of polymer/mole of metal/hour) described in the literature for the most active systems.

EXAMPLES

All the manipulations are carried out under argon. The solvents and liquid monomers are distilled over $CaH_2$.

The microstructure of the homopolymers and copolymers obtained in the following examples was determined by means of the $^1H$ NMR and $^{13}C$ NMR techniques. To this effect, a Bruker DRX 400 spectrometer was used at frequencies of 400 MHz for the $^1H$ NMR technique and of 100.6 MHz for the $^{13}C$ NMR technique.

The thermal properties (melting point and glass transition temperature) were measured by DSC (Differential Scanning calorimetry) on a Setaram DSC 131 instrument. The temperature program used corresponds to a temperature increase from −120° C. to 150° C. at the speed of 10° C./min.

The number-average molar masses (Mn) and the polydispersity index (PI) were determined by size exclusion chromatography using the instrument and the analytical conditions described in the following tables T1 and T2, with polystyrene or PMMA standards. The molar masses of the polyethylenes and of the copolymers of ethylene/polar monomers (semi-crystalline) are expressed as real masses, using a universal calibration technique by virtue of a double detection (refractometry and viscometry).

For the analysis of the polyethylenes and of the copolymers of ethylene/polar monomers (semicrystalline), the conditions are indicated below:

TABLE T1

| Instrument: | Waters Alliance GPCV 2000 |
|---|---|
| Columns: | 3 Waters Styragel HT6E columns |
| Temperature: | 150° C. |
| Solvent: | Trichlorobenzene |
| Elution speed: | 1 ml/min |

The molar masses of the polar homopolymers and of the copolymers of ethylene/polar monomers which are amorphous are expressed in polystyrene equivalents (when the copolymer contains styrene) or poly(methyl methacrylate) equivalents (when the copolymer contains a (meth)acrylic monomer) using detection with a refractometer. For the analysis of the polar homopolymers and of the copolymers of ethylene/polar monomers which are amorphous, the conditions are indicated below:

TABLE T2

| Instrument: | Waters, 515 HPLC (pump), RI 410 (detector) |
|---|---|
| Columns: | 1 x Waters Styragel HR 4E + 2 x Waters Styragel HR 5E |
| Temperature: | T column = 45° C., T detector = 40° C. |
| Solvent: | THF |
| Elution speed: | 1 ml/min |

In examples 1 to 12, the organometallic complexes used, denoted A and B, are prepared according to the methods described in Grubbs, *Organometallics* 1998 17, 3149 and Matt, *Chemistry—A European Journal*, 12(20), 5210-5219; 2006), respectively.

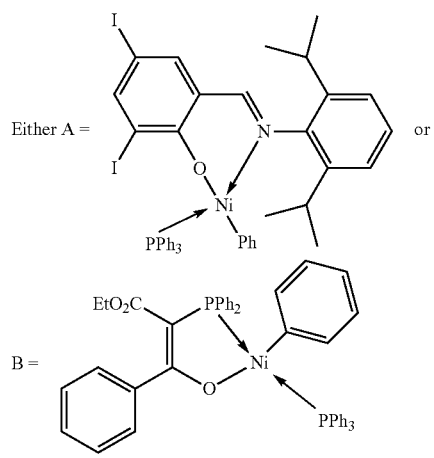

Examples 1-3

Copolymerizations of Polar Monomers with Two Types of Nickel Complexes

In examples 1 to 3, the copolymerization of the comonomers was carried out in bulk in the comonomers, in various proportions of said comonomers. The organometallic complex and, where appropriate, the triphenylphosphine are dissolved in said comonomers. The polymerization temperature is fixed by a thermostated bath in which the round-bottomed glass flask containing the reactants as defined above is immersed. After a reaction time t, the polymerization is stopped by cooling and then the polymer is obtained by precipitation from methanol. After drying, a mass m of polymer characteristic of the yield by mass (g) of the reaction is obtained.

The value of the reactivity ratios of two comonomers is an essential piece of mechanistic information since it makes it possible to identify the polymerization mechanism implemented.

In order to access these reactivity ratios, it is first of all necessary to set up the copolymerization equation. The following reactions for polymerization of the monomers A and B are considered:

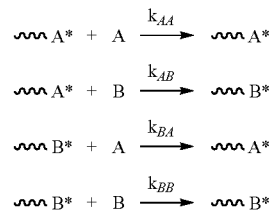

A* and B* being the active species associated with the monomers A and B, respectively. The same reactivity is considered for all the active species A* and B* respectively, irrespective of the length of the chain which substitutes the active species. Each active species A* and B* can react with the two monomers A and B present, according to the rate constants $k_{AA}$ and $k_{BB}$ for the homopolymerizations and $k_{AB}$ and $k_{BA}$ for the copolymerizations.

The reactivity ratios rA and rB can then be defined as the ratios between the rate constants of the homopolymerization and copolymerization reactions, i.e.:

$$rA = \frac{k_{AA}}{k_{AB}} \text{ and } rB = \frac{k_{BB}}{k_{BA}}$$

1. Type A Complex: Styrene/Butyl Acrylate (BuA) Copolymerization

[Ni]=2.2 mM, $V_{total\ monomers}$=10 ml (bulk polymerization in the monomers), $m_{3PPh3}$=20 mg of $PPh_3$ if addition of $PPh_3$ T=70° C., polymerization time=3 hours

TABLE I

| | % weight BuA feed | % weight BuA polymer | Yield g of polymer | Mn 1$^{st}$ peak g/mol (PI) | Mn 2$^{nd}$ peak g/mol (PI) | rA (styrene) calculated* | rB (BuA) calculated* | $R^2$* |
|---|---|---|---|---|---|---|---|---|
| without addition of PPh$_3$ | 20% | 20% | 0.67 | 2.4 × 10$^5$ (1.3) | 3.0 × 10$^4$ (1.6) | 0.82 | 0.27 | 1 |
| | 49% | 41% | 0.62 | 2.9 × 10$^5$ (1.2) | 4.0 × 10$^4$ (1.6) | | | |
| | 70% | 54% | 0.6 | 4.8 · 10$^5$ (1.3) | 7.0 × 10$^4$ (1.6) | | | |
| +3 eq. of PPh$_3$ | 20% | 20% | 0.83 | — | 3.8 × 10$^4$ (2.4) | 0.81 | 0.24 | 1 |
| | 49% | 40% | 0.87 | — | 4.8 × 10$^4$ (2.3) | | | |
| | 70% | 54% | 0.8 | — | 6.9 × 10$^4$ (1.9) | | | |

*calculated using the least squares method, $R^2$: coefficient of determination.

When the nickel complex is used alone (therefore with 1 PPh$_3$), the copolymerization takes place and produces the same copolymers (same degree of comonomer insertion) as when the nickel complex is used with 3 additional PPh$_3$. The addition of 3 PPh$_3$ results in a better yield.

The mechanism of copolymerization of butyl acrylate and of styrene using a polyolefin catalyst is therefore indeed a radical mechanism (rA and rB in agreement with the values reported in the literature, rA(styrene)=0.81 and rB(BuA)=0.22 according to the Polymer Handbook). The calculation of the reactivity ratios makes it possible to obtain the copolymer composition diagram (illustrated in the appended FIG. 1, with the example of the copolymerization of styrene and butyl acrylate). It is seen that the curve recalculated from the values of the reactivity ratios is in good agreement with the experimental values measured (with or without addition of PPh$_3$).

2. Type B Complex: Styrene/Butyl Acrylate Copolymerization

[Ni]=2.2 mM, V$_{total\ monomers}$=10 ml,
m$_{3PPh3}$=20 mg of PPh$_3$ if addition of PPh$_3$
T=70° C., polymerization time=3 hours

TABLE II

| | % wt BuA feed | % wt BuA polymer | Yield g of polymer | Mn g/mol (PI) | rA (styrene) calculated* | rB (BuA) calculated* | $R^2$* |
|---|---|---|---|---|---|---|---|
| without addition of PPh$_3$ | 20% | 21% | 0.36 | 3.1 × 10$^5$ (2.6) | 0.73 | 0.17 | 0.999 |
| | 39% | 35% | 0.33 | 3.3 × 10$^5$ (3.3) | | | |
| | 59% | 44% | 0.26 | 3.9 × 10$^5$ (2.8) | | | |
| | 80% | 58% | 0.22 | 3.6 × 10$^5$ (3.1) | | | |
| +3 eq. of PPh$_3$ | 20% | 18% | 0.40 | 2.1 × 10$^5$ (2.6) | 0.95 | 0.25 | 0.997 |
| | 39% | 33% | 0.36 | 3.5 × 10$^5$ (2.7) | | | |
| | 59% | 45% | 0.32 | 3.7 × 10$^5$ (2.5) | | | |
| | 80% | 58% | 0.23 | 3.1 × 10$^5$ (2.9) | | | |

*calculated using the least squares method, $R^2$: coefficient of determination

The mechanism of copolymerization of butyl acrylate and of styrene using a polyolefin catalyst is therefore indeed a radical mechanism (rA and rB in agreement with the values reported in the literature, rA(styrene)=0.81 and rB(BuA)=0.22 according to the Polymer Handbook).

3. Copolymerizations of Other Polar Monomers (MMA/Styrene, BuA/MMA)

The copolymerizations were carried out with two other pairs of polar monomers mentioned above (MMA being methyl methacrylate). The copolymerizations made it possible to access the reactivity ratios for the pairs of comonomers, using the least squares method.

TABLE III

| Comonomer A | Comonomer B | Ni complex used | rA calculated* | rB calculated* | $R^{2}$* | (rA)(rB) |
|---|---|---|---|---|---|---|
| Methyl methacrylate rA = 2.35** | Butyl acrylate rB = 0.33** | N,O-chelated alone | 0.74 | 0.17 | 1 | 0.13 |
| | | N,O-chelated with 3 PPh$_3$ | 0.82 | 0.21 | 1 | 0.17 |
| | | P,O-chelated alone | 0.97 | 0.30 | 0.989 | 0.29 |
| | | P,O-chelated with 3 PPh$_3$ | 1.63 | 0.55 | 0.951 | 0.90 |
| Styrene rA = 0.52*** | Methyl methacrylate rB = 0.46*** | N,O-chelated alone | 0.87 | 0.45 | 0.997 | 0.39 |
| | | N,O-chelated with 3 PPh$_3$ | 0.79 | 0.11 | 0.980 | 0.87 |
| | | P,O-chelated alone | 1.40 | 0.42 | 0.980 | 0.59 |
| | | P,O-chelated with 3 PPh$_3$ | 1.06 | 0.39 | 0.980 | 0.41 |

*calculated using the least squares method, $R^2$: coefficient of determination;
**reactivity ratio values reported in the Polymer Handbook for the radical copolymerization of methyl methacrylate and of butyl acrylate;
***reactivity ratio values reported in the Polymer Handbook for the radical copolymerization of styrene and of methyl methacrylate.

The copolymerization is promoted by the addition of phosphine ligand to the system.

Examples 4-14

Copolymerizations of Ethylene and of Polar Monomers with Two Types of Nickel Complexes The copolymerizations are carried out in a 160 ml stirred reactor. x mg of catalyst (and triphenylphosphine where appropriate) are dissolved in 50 ml of polar monomer and an ethylene pressure is applied to the solution. The temperature and the ethylene pressure are kept constant throughout the polymerization.

After a reaction time t, the polymerization is stopped by cooling and degassing the reactor, the polymer being obtained by precipitation from methanol. After drying, a mass m of polymer characteristic of the yield by mass (g) of the reaction is obtained.

Examples 4 to 9 use type A catalyst

TABLE IV

| Tests | T ° C. | $P_{C2}$ bar | Duration min | Yield g | Catalyst + xPPh$_3$ | Mn (pI) g/mol |
|---|---|---|---|---|---|---|
| 1 | 50 | 27 | 120 | 4.1 | x = 0 | 10 000 (3.0) |
| 2 | 50 | 100 | 120 | 6.5 | x = 0 | 12 000 (3.7) |
| 3 | 50 | 150 | 60 | 6.2 | x = 0 | NA |
| 4 | 50 | 250 | 120 | 6.1 | x = 0 | 24 000 (4.6) |
| 5 | 50 | 27 | 120 | 3.1 | x = 3 | 28100 (1.7) |
| | | | | | | 600 (2.0) |

TABLE IV-continued

| Tests | T ° C. | $P_{C2}$ bar | Duration min | Yield g | Catalyst + xPPh$_3$ | Mn (pI) g/mol |
|---|---|---|---|---|---|---|
| 6 | 50 | 100 | 120 | 1.2 | x = 3 | 37600 (1.9) |
| | | | | | | 2000 (1.5) |
| 7 | 50 | 150 | 120 | 4.5 | x = 3 | NA |
| 8 | 80 | 100 | 120 | 1.8 | x = 0 | 45500 (2.6) |
| | | | | | | 2700 (1.4) |
| 9 | 80 | 100 | 120 | 2.7 | x = 9 | 32400 (1.6) |
| | | | | | | 3400 (1.3) |
| 10 | 50 | 100 | 120 | 1.8 | x = 9 | 14400 (2.7) |
| | | | | | | 500 (1.5) |

TABLE V

Degree of insertion of MMA (mol %, determined by $^1$H NMR)

| Tests | 1 | 2 | 3 | 4 | 5 | 6 | 7 | 8 | 9 | 10 |
|---|---|---|---|---|---|---|---|---|---|---|
| mol % MMA | 20.5% | 2.7% | 0.2% | 0.3% | 34.0% | 7.7% | 4.5% | 53.3% | 87.7% | 50.1% |

4. Copolymerization of Ethylene and of Methyl Methacrylate

The duration is maintained at 120 minutes, which is the time for which the activity measured with respect to ethylene is stable.

Table V shows the degrees of molar insertion of MMA, calculated from the $^1$H NMR spectra of the copolymers. The MMA is considered according to the protons of the —OMe and the ethylene is considered according to the protons of the CH$_2$s minus the CH$_2$ and CH$_3$ those of the MMA.

TABLE VI thermal properties of the ethylene/MMA copolymers

| | Tests | | | | | | | | | |
|---|---|---|---|---|---|---|---|---|---|---|
| | 1 | 2 | 3 | 4 | 5 | 6 | 7 | 8 | 9 | 10 |
| Mp °C. (Tg °C.) | 112.3 | 122.4 | 125.5 | 130.4 | No | (109) | (113) | (106) | (104) | No |

Table VI shows the thermal properties of the ethylene/MMA copolymers containing between 66 mol % and 95.5 mol % of ethylene, with little or no melting point, thus showing the absence of homopolyethylene. Since the polymer nevertheless contains ethylene, copolymer is indeed present.

The $^{13}C$ NMR makes it possible to identify the signals corresponding to the ethylene and to the MMA and makes it possible to distinguish signals (at 21.9/22.6/23.5/32.8/33.5/34.8 ppm), attributed to the alternations between the ethylene and MMA units in the copolymer. These signals are of low intensity, which reflects the block (and not alternating or random) nature of the copolymer.

The DSC shows that the lengths of polyethylene blocks are insufficient to result in a significant melting phenomenon.

5. Copolymerization of Ethylene and of Butyl Acrylate

TABLE VII

| Tests | T °C. | $P_{C2}$ bar | Duration min | Yield g | Catalyst + $x$PR$_3$ | mol % BuA | Mn g/mol (PI) | Tg °C. |
|---|---|---|---|---|---|---|---|---|
| 1 | 50 | 25 | 485 | 0 | x = 0 | * | * | * |
| 2 | 50 | 100 | 210 | 0 | x = 0 | * | * | * |
| 3 | 50 | 25 | 210 | 2.2 | x = 3, R = Ph | 86.3% | 58 000 (5.2) | −49 |
| 4 | 50 | 100 | 120 | 0 | x = 3, R = Ph | * | * | * |
| 5 | 75 | 110 | 210 | 0 | x = 3, R = Ph | * | * | * |
| 6 | 50 | 100 | 240 | 1.0 | x = 9, R = Ph | 51.3% | 158 000 (3.3) | −53 |
| 7 | 50 | 30 | 210 | 0 | x = 3, R = Cy | * | * | * |
| 8 | 50 | 25 | 240 | 0 | x = 9, pyridine | * | * | * |

These results show that there is no melting point and therefore no long blocks of ethylene (and therefore no ethylene homopolymer). The glass transition temperature Tg corresponds to that of a PBuA (−50° C.), therefore compatible with the butyl acrylate blocks of a multiblock copolymer.

6. Copolymerization of Ethylene and of Styrene

TABLE VIII

| Tests | T °C. | $P_{C2}$ bar | Duration min | Yield g | Catalyst + $x$PR$_3$ | mol % styrene inserted | Mn g/mol (PI) |
|---|---|---|---|---|---|---|---|
| 1 | 50 | 25 | 180 | 1.2 | x = 0 | 64.2% | 4900 (1.8) |
| 2 | 50 | 110 | 180 | 0.3 | x = 0 | 16.5% | 7900 (3.2) |
| 3 | 50 | 25 | 180 | 2.2 | x = 3, R = Ph | 73.3% | 3400 (2.4) |
| 4 | 50 | 100 | 180 | 1.1 | x = 3, R = Ph | 42.1% | 100 000 (1.2) |
| 5* | 105 | 30 | 180 | 6.1 | x = 0 | 96.9% | 25 000 (4.9) |
| 6* | 105 | 100 | 60 | 1.9 | x = 0 | 90.5% | 35 000 (1.9) |

*40 ml styrene + 10 ml toluene

The polymers obtained are amorphous (no melting point); there is therefore no long block of ethylene (and therefore no ethylene homopolymer).

7. Copolymerization of Ethylene and of Methyl Acrylate

TABLE IX

| Tests | T °C. | $P_{C2}$ bar | Duration min | Yield g | Catalyst + $x$PR$_3$ | mol % MA | Mn g/mol (PI) | Tg °C. |
|---|---|---|---|---|---|---|---|---|
| 1 | 50 | 25 | 240 | 1.7 | x = 0 | 15.4% | 85 000 (5.6) | 20 |
| 2 | 50 | 100 | 240 | 0.5 | x = 0 | 5.9% | 92 000 (2.7) | 0 |
| 3 | 50 | 25 | 240 | 2.9 | x = 3, R = Ph | 1.4% | NA | 20 |
| 4 | 50 | 100 | 240 | 0.3 | x = 3, R = Ph | 36.2% | NA | 0 |

The thermal properties of the ethylene/methyl acrylate copolymers indicate that the polymers are amorphous and the Tgs observed oscillate around that of a poly(methyl acrylate) (at 10° C.), therefore compatible with the methyl acrylate blocks of a multiblock copolymer.

8. Copolymerization of Ethylene and of Butyl Methacrylate

TABLE X

| Tests | T ° C. | $P_{C2}$ bar | Duration min | Yield g | Catalyst + $x$PR$_3$ | mol % BuMA | Mn g/mol (PI) | Mp in ° C. |
|---|---|---|---|---|---|---|---|---|
| 1 | 50 | 25 | 240 | 3.4 | x = 0 | 7.2% | 7300 (23.7) | 113 |
| 2 | 50 | 100 | 330 | 8.9 | x = 0 | 0.5% | 8800 (18.3) | 128 |
| 3 | 50 | 25 | 240 | 3.3 | x = 3, R = Ph | 46.0% | 134 000 (6.5) | * |
| 4 | 50 | 100 | 240 | 5.7 | x = 3, R = Ph | 0.8% | NA | 126 |

The thermal properties of the ethylene/butyl methacrylate copolymers indicate that the polymers are semi-crystalline or amorphous. The crystallinity decreases with the degree of insertion of polar monomer.

9. Terpolymerization of Ethylene, of MMA of Butyl Acrylate

TABLE XI

| Tests | T ° C. | $P_{C2}$ bar | Monomers ml | Duration min | Yield g | Catalyst + $x$PR$_3$ | mol % MMA inserted | mol % BuA inserted | Mn g/mol (PI) |
|---|---|---|---|---|---|---|---|---|---|
| 1 | 50 | 30 | MMA/BuA 48/2 | 240 | 0.5 | x = 0 | 79.6% | 0% | 94 000 (6.1) |
| 2 | 50 | 25 | MMA/BuA 40/10 | 240 | 0 | x = 0 | * | * | * |
| 3 | 50 | 25 | MMA/BuA 25/25 | 240 | 0 | x = 0 | * | * | * |
| 4 | 50 | 25 | MMA/BuA 40/10 | 105 | 4.1 | x = 3, R = Ph | 41.2% | 7.1% | 64 000 (2.2) |
| 5 | 50 | 25 | MMA/BuA 25/25 | 240 | 1.6 | x = 3, R = Ph | 37.8% | 15.9% | 241 000 (6.2) |
| 6 | 50 | 30 | MMA/BuA 15/35 | 240 | 2.6 | x = 3, R = Ph | 32.6% | 28.8% | 205 000 (6.7) |

The polymers obtained are amorphous (no melting point), there is therefore no long block of ethylene (and therefore no ethylene homopolymer).

The following examples use type B catalyst.

10. Copolymerization of Ethylene and of Methyl Methacrylate

TABLE XII

| Tests | [Ni] in mM | $P_{C2}$ bar | Duration min | Yield g | Catalyst + $x$PPh$_3$ | mol % MMA | Mn (PI) g/mol | Mp ° C. |
|---|---|---|---|---|---|---|---|---|
| 1 | 0.5 | 30 | 60 | 1.3 | x = 0 | 0.9% | 370 (1.3) | * |
| 2 | 1.3 | 100 | 30 | 10.0 | x = 0 | 0.3% | 650 (1.2) | 110.8 |
| 3 | 0.5 | 100 | 60 | 4.1 | x = 0 | 0.6% | 970 (1.3) | NA |
| 4 | 0.6 | 28 | 60 | 0.7 | x = 3 R = Ph | 42.2% | 426 000 (2.2) | * |
| 5 | 0.5 | 100 | 60 | 2.5 | x = 3 R = Ph | 1.0% | 550 (1.1) | * |

The thermal properties of the ethylene/methyl methacrylate copolymers indicate that the polymers are semi-crystalline or amorphous. The crystallinity decreases with the degree of insertion of polar monomer.

11. Copolymerization of Ethylene and of Butyl Acrylate

TABLE XIII

| Tests | [Ni] in mM | $P_{C2}$ bar | Duration min | Yield g | Catalyst + $x$PR$_3$ | mol % BuA | Mn (PI) g/mol |
|---|---|---|---|---|---|---|---|
| 1 | 2.6 | 25 | 120 | 0 | x = 0 | * | * |
| 2 | 2.6 | 109 | 120 | 0 | x = 0 | * | * |
| 3 | 0.6 | 28 | 120 | 0 | x = 3 R = Ph | * | * |
| 4 | 1.3 | 28 | 120 | 0.4 | x = 3 R = Ph | NA | 406000 (8.2) |
| 5 | 2.6 | 25 | 120 | 1.0 | x = 3 R = Ph | 80.9% | 38 000 (6.4) |
| 6 | 2.6 | 115 | 120 | 0.8 | x = 9 R = Ph | 66.0% | NA |

The polymers obtained are amorphous (no melting point); there is therefore no long block of ethylene (and therefore no ethylene homopolymer).

12. Copolymerization of Ethylene and of Styrene

TABLE XIV

| Tests | [Ni] in mM | $P_{C2}$ bar | Duration min | Yield g | Catalyst + $x$PR$_3$ | % mol styrene | Mn (PI) g/mol |
|---|---|---|---|---|---|---|---|
| 1 | 0.5 | 28 | 120 | 3.8 | x = 0 | 7.6% | NA |
| 2 | 0.5 | 100 | 40 | 11.7 | x = 0 | 0% | 340 (2.2) |
| 3 | 0.6 | 30 | 120 | 1.1 | x = 3 R = Ph | 49.8% | 16 000 (3.4) |
| 4 | 0.6 | 100 | 120 | 1.7 | x = 3 R = Ph | 0% | NA |

The polymers obtained are amorphous (no melting point), there is therefore no long block of ethylene (and therefore no ethylene homopolymer).

The invention claimed is:

1. A method for preparing a block copolymer, comprising the step of copolymerizing at least one non-polar monomer, and at least one polar monomer, the copolymerization being carried out in the presence of a catalytic system made up of an organometallic complex of formula:

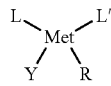

where:
a. Met represents a metal belonging to groups 8, 9 and 10,
b. Y represents a ligand molecule oxidizing the metal and made up of heteroatomic groups based on C, H and at least one atom selected from: O, S, P and N,
c. L represents a complexing molecule made up of heteroatomic groups based on C, H and at least one atom selected from: O, S, P and N, wherein Y and L may be linked by a covalent bond,
d. L' represents a monodentate, electron-donating, complexing molecule,
e. R is a hydrocarbon-based group of alkyl or alkylaryl type containing from 1 to 20 C atoms, or of cycloalkyl or phenyl type containing from 6 to 20 C atoms, said method resulting in the formation of a block copolymer which satisfies the following relationships:

Σp-a/Σp-p<<1

Σp-a/Σa-a<<1

Σp-a>1 (in each polymer chain), in which: "p-a" represents a bond between a polar monomer (p) and a non-polar monomer (a); "p-p" represents a bond between two polar monomers; "a-a" represents a bond between two non-polar monomers.

2. The method as claimed in claim 1, in which the metal is selected from the group consisting of: iron, cobalt, nickel, palladium and platinum.

3. The method as claimed in claim 1, in which Y and L are linked by a covalent bond.

4. The method as claimed in claim 1, in which the polar monomer is selected from the group consisting of: unsaturated carboxylic acids and derivatives thereof; unsaturated carboxylic acid esters; styrene derivatives, considered to be a polar monomer when combined with an alpha-olefin, ethylene or propylene; acrylamides and methacrylamides and derivatives thereof; and acrylonitrile and derivatives thereof.

5. The method as claimed in claim 2, in which the organometallic complex is a nickel complex.

6. The method as claimed in claim 5, in which the organometallic complex is a salicylaldimine complex having the following structure:

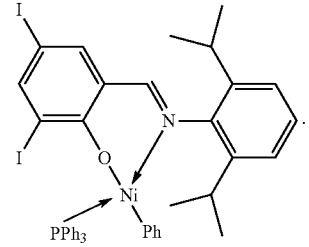

7. The method as claimed in claim 5, in which the organometallic complex is a phosphinoenolate complex having the following structure:

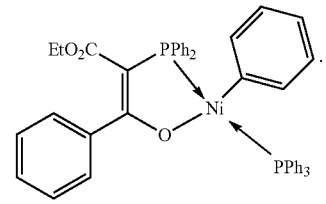

8. The method as claimed in claim 1, in which, when the polymerization is carried out in solution, the non-polar monomers, in the liquid or gaseous state, react with the polar monomers in the liquid state, in the presence of the organometallic complex, in an inert hydrocarbon-based solvent.

9. The method as claimed in claim 1, in which, when the polymerization is carried out in bulk, the non-polar monomers, in the liquid or gaseous state, react with the polar monomers in the liquid state, in the presence of the organometallic complex.

10. The method as claimed in claim 1, in which the polymerization is carried out at between −100° C. and 250° C., and at a pressure of between atmospheric pressure and 300 bar.

11. The method as claimed in claim 1, in which the number-average molecular weight of the block copolymer obtained is from $10^3$ to $10^6$ g/mol.

12. The method as claimed in claim 1, further comprising a step of adding a Lewis base to the reaction medium.

13. The method as claimed in claim 12, wherein said Lewis base is triphenylphosphine.

14. The method as claimed in claim 1, wherein:
said Y is a phenoxy,
said L is an imine or ylide,
said L' represents a phosphine or pyridine,
said R is a methyl or phenyl group.

15. The method as claimed in claim 1, in which the at least one polar monomer is selected from the group consisting of acrylic acid, methacrylic acid, methyl acrylate, methyl methacrylate, butyl methacrylate, styrene, alpha-methyl styrene, acrylamide, methacrylamide, acrylonitrile and butyl acrylate.

16. A composition comprised of a) one or more block copolymers obtained by the method as claimed in claim 1, comprising one or more polar monomer blocks and one or more non-polar monomer blocks, and said b) the catalytic system.

17. The composition as claimed in claim 16, in which the polar monomer is selected from the group consisting of: methyl acrylate, methyl methacrylate, butyl acrylate, butyl methacrylate and styrene.

18. The composition as claimed in claim 16, in which the molar contents of each of the comonomers range from 0.1% to 99.9%.

\* \* \* \* \*